(12) United States Patent
White et al.

(10) Patent No.: US 11,420,178 B2
(45) Date of Patent: Aug. 23, 2022

(54) SYSTEM FOR MAKING A COMPOSITION OF MATTER

(71) Applicant: Calhoun Chemical, LLC, Port Lavaca, TX (US)

(72) Inventors: Walter White, Houston, TX (US); Samuel Stratton, Houston, TX (US); Michael R. Boyd, Houston, TX (US)

(73) Assignee: Calhoun Chemical, LLC, Port Lavaca, TX (US)

( * ) Notice: Subject to any disclaimer, the term of this patent is extended or adjusted under 35 U.S.C. 154(b) by 167 days.

(21) Appl. No.: 16/958,000

(22) PCT Filed: Jan. 11, 2018

(86) PCT No.: PCT/US2018/013400
§ 371 (c)(1),
(2) Date: Jun. 25, 2020

(87) PCT Pub. No.: WO2019/139597
PCT Pub. Date: Jul. 18, 2019

(65) Prior Publication Data
US 2021/0060518 A1 Mar. 4, 2021

(51) Int. Cl.
*B01J 19/00* (2006.01)
*B01J 19/06* (2006.01)
(Continued)

(52) U.S. Cl.
CPC ............ *B01J 19/245* (2013.01); *B01F 23/41* (2022.01); *B01F 23/49* (2022.01); *B01J 19/06* (2013.01);
(Continued)

(58) Field of Classification Search
CPC .......... B01F 23/00; B01F 23/40; B01F 23/41; B01F 23/414; B01F 23/4143;
(Continued)

(56) References Cited

U.S. PATENT DOCUMENTS

| 6,787,506 B2 | 9/2004 | Blair et al. |
| 7,776,958 B2 | 8/2010 | Strominger et al. |

(Continued)

FOREIGN PATENT DOCUMENTS

WO 2016187177 11/2016

OTHER PUBLICATIONS

Leiming et al. A review of crosslinked fracturing fluids prepared with produced water. Petroleum 2 (2016) 313-323 (10 pages).

*Primary Examiner* — Natasha E Young
(74) *Attorney, Agent, or Firm* — Rao DeBoer Osterrieder, PLLC; John M. DeBoer (57) ABSTRACT

A system for making a composition of matter that may include a neutralization reactor; an oil phase mixer or preparation vessel; an aqueous phase mixer or preparation vessel; an emulsifier; a homogenizer or comparable; a polymerization reactor, which may be a tube reactor; and an inversion vessel or comparable. The system may be suitable to make or otherwise produce the composition that includes by weight percent about: 15-25% oil phase; 35-50% water; 20-35% polymer; 0-10% surfactant; and 0-3% other trace materials.

17 Claims, 1 Drawing Sheet

(51) Int. Cl.
  B01J 19/24 (2006.01)
  C09K 8/84 (2006.01)
  B01F 23/41 (2022.01)
  C09K 8/64 (2006.01)
  B01F 23/40 (2022.01)
  B01F 101/49 (2022.01)

(52) U.S. Cl.
  CPC ............ C09K 8/64 (2013.01); *B01F 23/4143* (2022.01); *B01F 23/4145* (2022.01); *B01F 2101/49* (2022.01); *B01F 2215/044* (2013.01); *B01F 2215/0431* (2013.01); *B01J 2219/0004* (2013.01); *C09K 2208/28* (2013.01)

(58) Field of Classification Search
  CPC .. B01F 23/4145; B01F 23/49; B01F 2101/00; B01F 2101/49; B01F 2215/00; B01F 2215/04; B01F 2215/0413; B01F 2215/0436; B01F 2215/0431; B01F 2215/044; B01J 19/00; B01J 19/06; B01J 19/24; B01J 19/245; B01J 2219/00; B01J 2219/00002; B01J 2219/00027; B01J 2219/0004; C09K 8/00; C09K 8/60; C09K 8/62; C09K 8/64; C09K 8/66; C09K 8/68; C09K 8/84; C09K 8/86; C09K 8/88; C09K 2208/00; C09K 2208/28

See application file for complete search history.

(56) References Cited

U.S. PATENT DOCUMENTS

| | | | |
|---|---|---|---|
| 8,394,396 B2 * | 3/2013 | Brick | .................. C01G 23/053 424/421 |
| 9,434,793 B1 * | 9/2016 | Kane | ......................... C08F 2/01 |
| 9,631,082 B2 | 4/2017 | Sexton et al. | |
| 9,683,153 B2 | 6/2017 | Davis et al. | |
| 2003/0191030 A1 | 10/2003 | Blair et al. | |
| 2005/0143506 A1 | 6/2005 | Harrington et al. | |
| 2012/0214714 A1 | 8/2012 | Whitwell et al. | |
| 2016/0160118 A1 | 6/2016 | van Oort et al. | |
| 2016/0251567 A1 | 9/2016 | Lin et al. | |
| 2016/0251568 A1 | 9/2016 | Do et al. | |
| 2017/0121590 A1 | 5/2017 | Lopez et al. | |
| 2017/0362487 A1 | 12/2017 | Waterman et al. | |

* cited by examiner

SYSTEM FOR MAKING A COMPOSITION OF MATTER

CROSS-REFERENCE TO RELATED APPLICATIONS

This application is a national stage application of PCT Application Ser. No. PCT/US2018/013400, filed on Jan. 11, 2018, and now published as WO 2019139597.

BACKGROUND

Field of the Disclosure

This disclosure relates to the inversion of a water-in-oil polymeric emulsion product. This disclosure relates to the use of combinations of surfactants to improve resultant compositions from an emulsion polymerization reaction. Particular embodiments pertain to reduced process time to produce a high-quality friction-reducing and/or viscosity-building additive for a frac fluid.

Background of the Disclosure

In a stimulation process, such as frac operation, a frac fluid (with varying additives) may be injected into a subterranean formation. In such an operation a large amount of frac fluid is pumped down a wellbore under high pressure to a depth of anywhere from 1000 feet to 20,000 feet or more, which results in fractures of the surrounding rock formation. The pressure is then relieved allowing valuable hydrocarbonaceous fluids to permeate out through the fractures and into the wellbore, where the fluids can be produced to a surface unit or facility.

Turbulence produced as the frac fluid is pumped through a tubular under pressure results in friction, which increases (in some instances, significantly) the amount of energy required to pump the injection fluid at sufficient speed and pressure.

Additives, including those of a polymeric nature, can be used to alter the rheological properties of the frac fluid so that friction is reduced, thereby reducing consequent energy loss. This type of additive (or combination of ingredients) is conventionally known as a 'friction reducer'. Friction reducers have a wide range of variation in terms of composition, utility, characteristics, and so forth. But in general a good friction reducer will result in a decrease in friction at small concentrations, will be inexpensive, environmentally approved, and will have high-shear, temperature, and pressure stability.

Various polymers can be used in friction reducers, some being better than others, and the selection of which being further dependent on factors such as formation type and the type of water available for injection fluid.

A friction reducer does not directly make it easier to produce formation fluids; instead, it typically helps get more frac fluid (and/or proppant) into the formation fractures, and reduces the overall energy requirement of the injection process. The reduction in friction means the same energy output can pump more frac fluid into the formation, which means more proppant/sand can be introduced into the fractures (to hold open), and thus more formation fluid (liquid, gas) can permeate out of the formation and into the wellbore.

An additive to frac fluid can also be useful for increasing the viscosity (or carrying capacity) of the frac fluid. This type of additive typically results in the frac fluid having a higher gel strength in order to carry more sand/proppant.

Such additives are used to increase overall operation efficiency, meaning less water, less energy, less stress on equipment, smaller equipment, and so forth, to obtain a similar or better result.

The composition of the additive and choice thereof is dependent on variables such as formation properties and the water source. While fresh water may be used, the cost may be high such that other options are considered, including produced water from the formation or previously used water (flowback, recycle, etc.). Whatever the case may be, the water and any contaminants therein can have detrimental effects on additives.

In some instances a natural polymer-based additive may be desired, such as a guar-based additive. These type of additives tend to be degradable, and better suited for environmental disposal. They tend to be cross-linked. A cross-linked polymer tends to be stronger, and better suited to handle harsher water choices, including salt- or oil-ladened produced water. However, the process for making this type of additive can be cumbersome and cost-ineffective.

Thus in some instances a synthetic polymer-based additive may be desired. This type of additive tends to be uncrosslinked and may provide better friction reducing ability, particularly if fresh or cleaner water is available. A common practice is to use a synthetic polymer additive mixed with water to make a frac fluid called "slickwater".

An inverse, or water-in-oil, polymerization (or also 'emulsion polymerization') can be utilized to prepare water-compatible polymers for adding to a frac fluid. Inverse emulsion refers to an aqueous (water) phase dispersed in a non-aqueous (oil) phase, where the aqueous phase and oil phase can also be referred to as the respective discontinuous (or dispersed) and continuous phases. The resultant water-compatible polymers are in the discontinuous aqueous phase.

The advantages of this process include the ability to prepare high molecular weight, water-compatible polymer in a low viscosity, high solids form. This process produces emulsions that are 20-50% polymer, exhibit low viscosity, and the polymer can have a molecular weight in the tens of millions. In contrast, other methods for preparation of high molecular weight water-soluble polymers include solution polymerization of water-soluble monomers, which results in a low solids solution (<5% polymer), and/or high solution viscosity, and/or lower product molecular weight. The low product solids can also be more costly to ship.

Inverse emulsion polymers can be prepared and stabilized using surface active agents, or 'surfactants'. Surfactant choice is typified by one that permits the emulsification of a water-soluble monomer in to the oil phase prior to polymerization, and provides stability to the resultant emulsion polymer. Stability, which includes resistance to settling, minimal changes in viscosity with time and premature inversion, not to mention the need for a stable emulsion during the polymerization process, can require a robust emulsion stabilization package or system.

Subsequent inversion of the water-in-oil emulsion refers to the process where the phases are reversed, and the produced polymer is released from the discontinuous phase. This step can be further assisted by the addition of a surfactant (sometimes 'breaker surfactant' or 'secondary surfactant') to the emulsion that can disrupt the original emulsion stabilization. This process can further use some level of agitation or shear. The result is the inversion, or phase reversal, of the water-in-oil emulsion. Moreover, the polymer is now available to interact with other aqueous phase materials.

Inverse emulsions that produce water soluble polymers can be based upon non-ionic monomers such as acrylamide; methacrylamide; N-alkylacrylamides, such as N-methylacrylamide; N,N-dialkylacrylamides, such as N,N-dimethylacrylamide; methyl acrylate; methyl methacrylate; acrylonitrile; N-vinyl methylacetamide; N-vinylformamide; N-vinyl methylformamide; vinyl acetate; N-vinyl pyrrolidone; hydroxyalky(meth) acrylates such as hydroxyethyl (meth) acrylate or hydroxypropyl(meth) acrylate; mixtures of any of the foregoing, and the like. Copolymers, containing 2 or more different monomers, can also be prepared. Moreover, the copolymer may contain one or more anionic or cationic monomers. The resultant copolymer can be non-ionic, cationic, anionic, or amphoteric (contains both cationic and anionic charge). Ionic water-soluble polymers, or polyelectrolytes, can be produced by copolymerizing a non-ionic monomer with an ionic monomer, or by post polymerization treatment of a non-ionic polymer to impart ionic functionality.

Emulsification surfactants used in emulsion polymerization systems are known to those skilled in the art. Exemplary emulsification surfactants include, but are not limited to, sorbitan monooleate, sorbitan sequioleate, sorbitan trioleate, polyoxyethylene sorbitan monooleate, di-2-ethylhexylsulfosuccinate, oleamido-propyldimethylamine, sodium isostearyl-2-lactate of mixtures thereof. The emulsification surfactant(s) of the polymerization products of interest may include at least one diblock or triblock polymeric surfactant. It is known that these surfactants are highly effective emulsion stabilizers, but can be difficult to invert.

Exemplary diblock and triblock polymeric emulsification surfactants include, but are not limited to, diblock and triblock copolymers based on polyester derivatives of fatty acids and poly[ethyleneoxide] (e.g., Hypermer® B246SF, Uniqema, New Castle, Del.), diblock and triblock copolymers of ethylene oxide and propylene oxide, (e.g., Pluronic® F-127 and Pluronic® 25R2 (BASF Corp., Mt. Olive, N.J.) diblock and triblock copolymers based on polyisobutylene succinic anhydride and poly[ethyleneoxide], reaction products of ethylene oxide and propylene oxide with ethylenediamine, mixtures of any of the foregoing and the like. The diblock and triblock copolymers emulsification surfactants can be based on polyester derivatives of fatty acids and poly[ethyleneoxide].

However, there are extensive problems with the commercial reality of using inverse emulsification processes to obtain a soluble polymeric-based. First and foremost in order to profitably manufacture such an end product, massive scale is needed, requiring significant capital for energy, plant size, equipment, manpower, etc., often in upfront costs of $100's of millions. Moreover, such processes also require significant amounts of time for reaction, cooling, and other aspects, often in the range of 12-14 hours, and sometimes longer.

Finally, polymeric friction reducers typically lack an ability to be both good friction reducers and viscosity building, as these two properties conflict. Because synthetic polymer-based frac fluid tends be very low in viscosity, its proppant carrying ability is significantly hindered, and any proppant that is used tends to be of reduced size. Moreover, high pump rates (and HP) and larger volumes of cleaner water are required.

What is needed is a composition of matter for use as an additive into a frac fluid that can be both friction reducing and viscosity building, or better at one or the other with slight compositional change. There is a need in the art for a cost-effective, expedient, and scalable process that can be used to make a composition of matter for use as an additive into a frac fluid. What is further needed is the ability to control slight process changes that result in a composition having improved friction reducing ability, improved viscosity building ability, or both.

SUMMARY

Embodiments herein may be useful for making and/or using a composition of matter, the composition having by approximate weight percent about: 15-25% oil phase; 35-50% water; 20-35% polymer; 0-10% surfactant; and 0-3% other trace materials. The composition may be dried to form a powder or other dry form. The composition may be made from a water-in-oil emulsification polymerization reaction. The polymer of the composition may be an acrylamide-based copolymer. The polymer may have a molecular weight distribution of about 10 million Daltons to about 30 million Daltons.

Embodiments herein provide for making and/or using a composition of matter that may have by weight percent about 15-25% oil phase; 35-50% water; 20-35% polymer; 0-10% surfactant; and 0-3% other trace materials. In aspects, the composition may be made from a water-in-oil emulsification polymerization reaction between an aqueous phase and an oil phase. The oil phase may be prepared with a blend of sorbitan monooleate and primary surfactant having a weight ratio to each other from about 40:60 to about 60:40. The weight ratio may be about 49:51 to 51:49.

The composition may be mixed with a water stream comprising about 0 to about 80,000 ppm total dissolved solids. The resultant mixture may result in the water stream being characterized by improved friction reduction and/or viscosity building. The resultant mixture may be injected or otherwise transferred from a surface facility (or related equipment) into a wellbore. The resultant mixture may have other constituents added, such as sand or other proppant types.

Other embodiments of the disclosure pertain to a process for making a composition of matter that may include the steps of preparing an aqueous phase and an oil phase; emulsifying or otherwise processing the aqueous phase and the oil phase together to form a water-in-oil emulsification; homogenizing or otherwise processing the water-in-oil emulsification to form an emulsification product; initiating or otherwise causing a polymerization reaction of the emulsification product to form a polymerization reaction product; inverting or otherwise processing the polymerization product to form the composition of matter.

The composition by weight percent may include about: 15-25% oil phase; 35-50% water; 20-35% polymer; 0-10% surfactant; and 0-3% other trace materials.

Still other embodiments of the disclosure pertain to a process for making and using a composition of matter that may include the steps of preparing an aqueous phase and an oil phase; emulsifying the aqueous phase and the oil phase together to form a water-in-oil emulsification; homogenizing the water-in-oil emulsification to form an emulsification product; initiating a polymerization reaction of the emulsification product to form a polymerization reaction product; inverting the polymerization product to form the composition of matter.

The composition of matter may include by weight percent about: 15-25% oil phase; 35-50% water; 20-35% polymer; 0-10% surfactant; and 0-3% other trace materials.

In aspects, the composition of matter may be mixed with a water stream comprising about 0 to about 80,000 ppm total dissolved solids. The resultant mixture may result in the water stream being characterized by improved friction reduction and/or viscosity building. The resultant mixture may be injected or otherwise transferred from a surface facility (or related equipment) into a wellbore. The resultant mixture may have other constituents added, such as sand or other proppant types.

A weight percent of total constituents used through the steps of the process may include about: 19-22% hydrocarbonaceous fluid; 1.5-2.0% blend of 40:60 to 60:40 by weight ratio sorbitan monooleate to primary surfactant; 5-13% ice; 5-12% acrylic acid; 4-10% of 28% ammonia; 0.05-0.15% chelating agent; 0.05-0.15% sodium bromate; 6-17% water; 30-40% of 53% acrylamide; 0.01-1% of 0.8% sodium metabisulfate; 0.1-0.5% AZO initiator; 0.4-0.5% of 32% sodium metabisulfate; and 4-5% secondary surfactant.

Still other embodiments of the disclosure pertain to a system for making a composition of matter that may include a neutralization reactor; an oil phase mixer or preparation vessel; an aqueous phase mixer or preparation vessel; an emulsifier; a homogenizer or comparable; a polymerization reactor, which may be a tube reactor; an inversion vessel or comparable.

The system may be suitable to make or otherwise produce the composition that includes by weight percent about: 15-25% oil phase; 35-50% water; 20-35% polymer; 0-10% surfactant; and 0-3% other trace materials.

Yet still other embodiments of the disclosure provide for a system for making a composition of matter that may include a neutralization reactor configured to produce a neutralization product. The neutralization reactor may be operated under pressure. The neutralization reactor may be controlled to a neutralization reaction temperature in the range of about 65° F. to about 70° F. The system may include an oil phase mixer configured to mix an oil-based material, sorbitan monooleate, and a primary surfactant. The sorbitan monooleate and primary surfactant may have a weight ratio to each other from about 40:60 to about 60:40.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Herein disclosed are novel apparatuses, systems, and methods that pertain to a polymeric-based additive for use in wellbore fluid, details of which are described herein. It has been discovered that a synthetic polymer, surfactant-prepped composition of matter for use as an additive to a frac fluid can be manufactured without the need for huge capital expenditure. The overall process time involved to produce the composition can be 30 minutes or less.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, and so forth. One or more valves may need to be opened so that respective components transfer into the gun assembly. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

The term "frac operation" as used herein can refer to fractionation of a downhole well that has already been drilled. 'Frac operation' can also be referred to and interchangeable with the terms fractionation, hydraulic fracturing, hydrofracturing, hydrofracking, fracking, fraccing, and frac. A frac operation can be land or water based.

The term "frac fluid" as used herein can refer to a fluid injected into a well as part of a frac operation. Frac fluid is often characterized as being largely water, but with other constituents such as proppant, friction reducers, and other additives or compounds. 'Frac' can be short for fracking, fracturing and other related terms. The term 'frac fluid' can be analogous to injection fluid, and other comparable terms of the art. The composition of the frac is often depends on numerous factors, with the ultimate goal being to improve the results of the frac operation and the productivity of the well. This typically occurs from the frac fluid being pumped down a wellbore and out into a subterranean formation in a suitable amount and pressure to cause fracturing in the surrounding rock.

The term "water" as used herein can refer to the main constituent for a frac fluid, and can include fresh water, seawater, produced water, treated variations thereof, mixes thereof, etc., and can further include impurities, dissolved solids, ions, salts, minerals, and so forth. Water for the frac fluid can also be referred to as 'frac water'.

The term "produced water" as used herein can refer to water recovered from a subterranean formation or other area near the wellbore. Produced water can include 'flowback water', which is water recovered from the subterranean formation after a frac operation.

The term "friction reducer" as used herein can refer to a chemical additive that alters fluid rheological properties to reduce friction associated with a fluid as it flows through tubulars or similar restrictions. The use of a friction reducer is intended to, among other things, reduce losses attributable to the effects of the friction. A hypothetical example of 'loss' can be the extra energy needed for a pump to pump a fluid without a friction reducer into a subterranean formation versus the reduced energy needed to pump the same amount of the same fluid having the added friction reducer.

The term "natural polymer-based friction reducer" as used herein can refer to a friction reducer characterized as having a 'natural' polymer as a constituent. A guar-based polymer (and/or copolymer) is an example of a natural polymer known to be useful for a friction reducer. A natural polymer-based friction reducer may have a characteristic of being cross-linked.

The term "synthetic polymer-based friction reducer" as used herein can refer to a friction reducer characterized as having a 'synthetic' or man-made polymer as a constituent. An acrylamide-based polymer (and/or copolymer) is an example of a synthetic polymer known to be useful for a friction reducer.

The term "crosslinked" as used herein can refer to polymer chains that have multiple bonds, such as covalent or ionic bonds, linking them together. Cross-links in chains can be formed by initiating a chemical reaction, including with various mediums such as heat, pressure, change in pH, radiation, and so forth. For example, mixing of an unpolymerized or partially polymerized resin with specific chemicals (e.g., crosslinking reagents) can result in a chemical reaction that forms cross-links.

The term "proppant" as used herein can refer to particulate material added to a frac fluid that is ultimately intended to maintain space between in the formed fractures.

The term "slickwater" (or "slick water") as used herein can refer to a frac fluid having a synthetic polymer-based friction reducer. Conventional slickwater frac fluid solutions can be characterized as having lower viscosity and proppant carrying capability, including significantly so.

The term "chemical" as used herein can analogously mean or be interchangeable to material, chemical material, ingredient, component, chemical component, element, substance, compound, chemical compound, molecule(s), constituent, and so forth and vice versa. Any 'chemical' discussed in the present disclosure need not refer to a 100% pure chemical. For example, although 'water' may be thought of as H2O, one of skill would appreciate various ions, salts, minerals, impurities, and other substances (including at the ppb level) may be present in 'water'. As used with respect to a chemical, unless specifically indicated otherwise, the singular includes all isomeric forms and vice versa (for example, "hexane", includes all isomers of hexane individually or collectively).

The term "chelating agent" as used herein can refer to a chemical compound (or a material thereof) useful to improve the ability or likelihood that a metal (or metal complex) will bond with other substances. An example chelating agent is Versenex 80 by the Dow Chemical Company.

The term "salt" as used herein can refer to an ionic compound. A salt can be formed via aneutralization reaction. A salt can be electrically neutral (i.e., no net charge).

The term "nitrile" as used herein can refer to an organic chemical (or material thereof) that has a —C≡N functional group.

The term "AZO compound" as used herein can refer to a chemical compound (or material thereof) bearing the functional group R—N=N—R'. The R and/or R' can be aryl or alkyl.

An AZO compound based material can be useful for initiating a polymeric reaction of a monomer.

The term "initiator" as used herein can refer to a chemical (or a material thereof) used to initiate a polymeric reaction of a monomer.

The term "AZO initiator" as used herein can refer to an AZO compound suitable to have a radical or can form a radical, such as via decomposition with heat or light, that can be used in a polymerization reaction (which may be referred to as 'radical polymerization'). An example AZO initiator that decomposes by heat is VAZO 52 by The Chemours Company.

The term "ammonia" as used herein can be a material identified by CAS Number 7664-41-7. Ammonia in aqueous solution can at times also be referred to as ammonium hydroxide, industrial ammonia, ammonia solution, and so forth. One of skill would appreciate that ammonia (NH3) differs from ammonium hydroxide (NH4OH), but that ammonium hydroxide can result from some amount of ammonia mixed with some amount of water (or NH3(aq)). Aqueous ammonia can have a concentration of ammonia of about 20% to about 35%. (see CAS No. 1336-21-6-~28% to 30% NH3).

The term "bromate material" as used herein can refer to a material having a chemical with a —BRO3 group.

The term "sodium bromate" as used herein can refer to a bromate material identified by CAS No. 7789-38-0.

The term "sulfite material" as used herein can refer to a material having a chemical with a sulfite ion or an —SO3 group.

The term "sodium metabisulfate" (or 'SMBS') as used herein can refer to a sulfite material identified by CAS No. 7681-57-4.

The term "acrylic acid" as used herein can refer to a material identified by CAS No. 79-10-7. Acrylic acid can be reacted to form acrylamide or other monomers.

The term "acrylamide" as used herein can be a material identified by CAS Number 79-06-01.

The term "polyacrylamide" (or 'PAM') as used herein can be a material identified by CAS Number 9003-05-08. PAM can be synthesized as a linear copolymer, can be crosslinked, and can be part of a copolymer.

The term "neutralization" as used herein can refer to a reaction between an acid-based material and a base-based material to form water and a salt(s), the resulting solution being characterized by a PH level.

The term "monomer" as used herein can refer to a chemical (or material thereof) characterized as having a molecule (or unit) that can bind to other molecules. Large numbers of monomer units can bind to form polymers. Small numbers of monomer units can combine to form oligomers.

The term "oligomer" as used herein can refer to a molecular complex having a few monomer units (e.g., dimers—two monomers, trimers—three monomers, tetramers—four monomers, etc.).

The term "polymer" as used herein can refer to large molecule (or material thereof) having linked (bonded) monomer units linked. A polymer can be considered to be a chain of monomer units. A polymer can be composed of one or more monomers. Copolymers can refer to a molecule (or material thereof) having two monomers. The polymer chain may be linear or branched. A polymer can be anionic, cationic, non-ionic, and in some instances be a combination. For example, a copolymer may have anionic and cationic properties. 'Polymer' may refer to copolymer.

The term "polymeric" or "polymer-based" can refer to a chemical (or material thereof) made of a polymer.

The term "plasticizer" as used herein can refer to an additive useful to increase or otherwise effect the viscosity of a material.

The term "emulsifier" as used herein can refer to a surfactant. An emulsifier that is more soluble in water (and conversely, less soluble in oil) will generally be useful to form oil-in-water emulsions, whereas an emulsifier that is more soluble in oil will generally be useful to form water-in-oil emulsions. An 'emulsion surfactant' can refer to a surfactant useful to stabilize an emulsion.

The term "inverse emulsion" or "inverse polymeric emulsion reaction" as used herein can refer to an oil-water emulsion, a water-in-oil inverse emulsion, and an oil-in-water emulsion in an equivalent manner. A water-in-oil emulsion can refer to an emulsion where the continuous phase is an organic material, such as a hydrocarbonaceous fluid, oil, and so forth, and the dispersed phase is water or an aqueous solution.

The term "surfactant" as used herein can refer to a chemical compound (or material thereof) having a hydrophilic, water interactive end, and a lipophilic end. A surfactant (short for 'surface active agent') can lower the surface tension between an interface, such as at the interface between two liquids like an oil and water. A surfactant can be characterized as non-ionic, cationic, or anionic. Generally, the stronger the tendency to accumulate at the interface, the better the surfactant.

The term "hydrophilic-lipophilic balance" (or 'HLB') as used herein can refer to a measure or value of the degree to which a surfactant is hydrophilic or lipophilic. As known to one of skill in the art the scale for HLB is 0 to 20, with higher numbers pertaining to the property of being hydrophilic, water soluble; and lower number pertaining to the property of being lipophilic (or sometimes analogously, hydrophobic), oil soluble (or water insoluble).

The term "micelle" can refer to a molecular aggregate of a surfactant with the hydrophilic "head" regions in contact with surrounding solvent, sequestering the hydrophobic single-tail regions in the micelle center, or vice versa.

The term "sorbitan monooleate" (or 'SMO') can refer to a non-ionic, water insoluble surfactant (or material thereof) identified by CAS No. 1338-43-8. It can also be referred to or analogous to common trade or brand name surfactants like 'Span 80'.

The term "inverter" can refer to a surfactant (or material thereof) useful to invert an emulsion. For example, the presence or introduction of an inverter can cause an oil-water emulsion to 'invert' to a water-oil emulsion, or vice versa. 'Inverter' can be analogous to a 'breaker' or 'breaker surfactant'.

The term "polymeric-based" as used herein can refer to a chemical or chemical blend (or material thereof) that includes or has a polymeric constituent as part of its compositional makeup. The chemical or blend may be referred to as a composition of matter. The polymeric constituent can be, but need not have to be, copolymeric.

Embodiments herein may be useful for making and/or using a composition of matter, the composition having by approximate weight percent about: 15-25% oil phase; 35-50% water; 20-35% polymer; 0-10% surfactant; and 0-3% other trace materials. The composition may be dried to form a powder or other dry form.

The composition may be made from a water-in-oil emulsification polymerization reaction.

The water-in-oil emulsification polymerization reaction may be a water-in-oil emulsification product formed by an aqueous phase emulsified with an oil phase. The reaction may occur in micelles of the emulsification product.

The composition of matter may be mixed with a water stream comprising about 0 to about 80,000 ppm total dissolved solids (tds). In aspects, there may be about 10,000 ppm to 80,000 ppm tds.

The oil phase may be prepared with an organic material, such as a hydrocarbonaceous fluid, and with sorbitan monooleate—primary surfactant blend having a weight ratio to each other from about 40:60 to about 60:40. In aspects, the weight ratio may be about 49:51 to about 51:49.

The polymer of the composition may be an acrylamide-based copolymer. The polymer may have a molecular weight distribution of about 10 million Daltons to about 30 million Daltons.

The water-in-oil emulsification product may be homogenized or otherwise processed to form or have micelles having a bulk average diameter of about 0.1 microns to about 1 micron. In aspects, the bulk average diameter may be about 0.5 microns to about 0.6 microns.

A reaction temperature of the water-in-oil emulsification polymerization reaction may be in the range of about 175° F. to about 240° F. In aspects, the reaction temperature may be in the range of about 180° F. to about 230° F.

Inversion or processing of a product from the water-in-oil emulsion polymerization reaction may include use of a secondary or 'breaker' surfactant. The secondary surfactant may have HLB in a range of about 10 to about 15.

The emulsification polymerization reaction may include use of a weight percent ratio of an initiator to total monomer in the range of about (0.01-0.05):1.

A bulk residence time of the water-in-oil emulsification polymerization reaction may be in a time range of about 0.01 minutes to about 5 minutes.

Embodiments herein provide for making and/or using a composition of matter that may have by weight percent about 15-25% oil phase; 35-50% water; 20-35% polymer; 0-10% surfactant; and 0-3% other trace materials. In aspects, the composition may be made from a water-in-oil emulsification polymerization reaction between an aqueous phase and an oil phase.

The oil phase may be prepared with a blend of sorbitan monooleate and primary surfactant having a weight ratio to each other from about 40:60 to about 60:40. The weight ratio may be about 49:51 to 51:49.

The composition may be mixed with a water stream comprising about 0 to about 80,000 ppm total dissolved solids. The resultant mixture may result in the water stream being characterized by improved friction reduction and/or viscosity building. The resultant mixture may be injected or otherwise transferred from a surface facility (or related equipment) into a wellbore. The resultant mixture may have other constituents added, such as sand or other proppant types.

The polymer of the composition may be an acrylamide-based copolymer. The polymer may have a molecular weight distribution of about 10 million Daltons to about 30 million Daltons.

The water-in-oil emulsification polymerization reaction may occur in micelles having a bulk average diameter of about 0.1 microns to about 1 micron. In aspects, the bulk average diameter may be about 0.5 microns to about 0.6 microns.

Inversion or processing of a product from the water-in-oil emulsion polymerization reaction may include use of a secondary surfactant having an HLB in a range of about 10 to about 15.

The process may include use of an initiator to total monomer weight percent ratio in the range of about (0.01-0.05):1.

The reaction temperature of the water-in-oil emulsification polymerization reaction may be in the range of about 175° F. to about 240° F.

Other embodiments of the disclosure pertain to a process for making a composition of matter that may include the steps of preparing an aqueous phase and an oil phase; emulsifying or otherwise processing the aqueous phase and the oil phase together to form a water-in-oil emulsification; homogenizing or otherwise processing the water-in-oil emulsification to form an emulsification product; initiating or otherwise causing a polymerization reaction of the emulsification product to form a polymerization reaction product; inverting or otherwise processing the polymerization product to form the composition of matter.

The composition by weight percent may include about: 15-25% oil phase; 35-50% water; 20-35% polymer; 0-10% surfactant; and 0-3% other trace materials.

The composition of matter may be mixed with a water stream comprising about 0 to about 80,000 ppm total dissolved solids.

The oil phase may be prepared with an organic material, such as a hydrocarbonaceous fluid, and with a blend of sorbitan monooleate to primary surfactant having a weight ratio to each other from about 40:60 to about 60:40. The blend weight ratio may be about 50:50.

The resultant aqueous phase may be prepared or otherwise formed from water, ammonium acrylate, and acrylamide solution. The resultant aqueous phase may have a pH between about 6.9 to about 7.1. In aspects, the ammonium acrylate may be produced from a neutralization reaction occurring at a temperature of about 65° F. to about 70° F.

The polymer of the composition may be an acrylamide-acrylate copolymer. The polymer may be an acrylamide-based copolymer. The polymer may have a molecular weight distribution of about 10 million Daltons to about 30 million Daltons.

The homogenization step may result in the emulsification product having micelles with a bulk average diameter of about 0.1 microns to about 1 micron. In aspects, the bulk average diameter may be about 0.5 microns to about 0.6 microns.

The reaction temperature of the polymerization reaction may be in the range of about 175° F. to about 240° F.

The inversion step may include use of a secondary surfactant having an HLB in a range of about 10 to about 15.

The process may include use of a weight percent ratio of an oil-soluble AZO initiator to total monomer in a range of about (0.01-0.05):1.

A bulk residence time of the polymerization reaction may be in a reaction time range of about 0.01 minutes to about 5 minutes.

Still other embodiments of the disclosure pertain to a process for making and using a composition of matter that may include the steps of preparing an aqueous phase and an oil phase; emulsifying the aqueous phase and the oil phase together to form a water-in-oil emulsification; homogenizing the water-in-oil emulsification to form an emulsification product; initiating a polymerization reaction of the emulsification product to form a polymerization reaction product; inverting the polymerization product to form the composition of matter.

The composition of matter may include by weight percent about: 15-25% oil phase; 35-50% water; 20-35% polymer; 0-10% surfactant; and 0-3% other trace materials.

In aspects, the composition of matter may be mixed with a water stream comprising about 10,000 to about 80,000 ppm total dissolved solids.

The resultant mixture may result in the water stream being characterized by improved friction reduction and/or viscosity building. The resultant mixture may be injected or otherwise transferred from a surface facility (or related equipment) into a wellbore. The resultant mixture may have other constituents added, such as sand or other proppant types.

A weight percent of total constituents used through the steps of the process may include about: 19-22% hydrocarbonaceous fluid; 1.5-2.0% blend of 40:60 to 60:40 by weight ratio sorbitan monooleate to primary surfactant; 5-13% ice; 5-12% acrylic acid; 4-10% of 28% ammonia; 0.05-0.15% chelating agent; 0.05-0.15% sodium bromate; 6-17% water; 30-40% of 53% acrylamide; 0.01-1% of 0.8% sodium metabisulfate; 0.1-0.5 AZO initiator; 0.4-0.5% of 32% sodium metabisulfate; and 4-5% secondary surfactant.

The polymer may be an acrylamide-based (co)polymer having a molecular weight distribution of about 10 million Daltons to about 30 million Daltons.

The process may include the use of a secondary surfactant having an HLB in a range of about 10 to about 15.

The process may include the use of a weight percent ratio of polymerization initiator to total monomer in the range of about (0.01-0.05):1.

The aqueous phase may include water, ammonium acrylate, and an amide-based solution. The step of preparing the aqueous phase may include controlling the pH between about 6.9 to about 7.1. In aspects, the ammonium acrylate may be produced from a neutralization reaction occurring at a temperature of about 65° F. to about 70° F.

The homogenization step (or comparable processing) may result in the emulsification product having micelles with a bulk average diameter of about 0.5 microns to about 0.6 microns.

In aspects, a weight percent of total constituents used through process may be about: 19-22% hydrocarbonaceous fluid; 1.5-2.0% blend of 40:60 to 60:40 by weight ratio sorbitan monooleate to primary surfactant; 5-13% ice; 5-12% of an acid; 4-10% of a base; 0.05-0.15% chelating agent; 0.05-0.15% of a bromate material; 6-17% water; 30-40% of an amide material; 00.01-1% a sulfite material of a first concentration; 0.1-0.5 initiator having the functional group R—N═N—R'; 0.4-0.5% of a sulfite material of a second concentration; and 4-5% secondary surfactant.

Still other embodiments of the disclosure pertain to a system for making a composition of matter that may include a neutralization reactor; an oil phase mixer or preparation vessel; an aqueous phase mixer or preparation vessel; an emulsifier; a homogenizer or comparable; a polymerization reactor, which may be a tube reactor; an inversion vessel or comparable.

The system may be suitable to make or otherwise produce the composition that includes by weight percent about: 15-25% oil phase; 35-50% water; 20-35% polymer; 0-10% surfactant; and 0-3% other trace materials.

The neutralization reactor may be configured and operated to produce an at least 99% ammonium acrylate neutralization product. The neutralization reactor may be sealed and operated under pressure. The reactor may be controlled to a neutralization reaction temperature in the range of about 65° F. to about 70° F. The reactor may be operated to achieve or otherwise sustain a bulk reaction residence time of about 0.1 minutes to about 5 minutes.

The phase mixer may be configured to mix an organic material, which may be a hydrocarbonaceous fluid or suitable oil-based material, and a blend of sorbitan monooleate and a primary surfactant. The primary surfactant may be non-ionic and oil soluble. The resultant product may be an organic phase product.

The aqueous phase mixer may be configured to receive the neutralization product. The neutralization product may be a solution of at least at least 99% ammonium acrylate. In the mixer, the neutralization product may be mixed with a solution of monomer(s). The resultant product may be an aqueous phase product. The aqueous phase mixer may be operated or otherwise controlled to produce the aqueous phase product having a pH of about 6.9 to about 7.1.

The emulsifier may be operated under batch conditions. For example, the emulsifier may be configured to receive the oil phase product first, and then the aqueous phase product second. The emulsifier may be configured and operated to form an emulsification. The emulsification may be characterized by having oil as a continuous phase and water as a dispersed phase. The emulsification may be a water-in-oil emulsification.

The system may be configured in a manner whereby the homogenizer may receive the water-in-oil emulsification. The homogenizer may be configured and operated to form an emulsification product comprising micelles. The emulsification may be processed in a manner whereby the micelles have a bulk average diameter of about 0.1 microns to about 1 micron.

The system may be configured in a manner whereby the polymerization reactor may receive the emulsification product and an initiator. The initiator may be a polymerization initiator. The reactor may be configured in operated to produce a polymerization reaction product. The polymerization reactor may be controlled and operated at a polymerization reaction temperature in a range of about 175° F. to about 240° F. In aspects, the range may be about 180° F. to about 230° F.

The system may be configured in a manner whereby the inversion vessel may be configured for the mixing of a secondary surfactant with the polymerization reaction product. Upon processing or inversion, the system may produce the composition of matter, the composition having by weight percent about: 15-25% oil phase; 35-50% water; 20-35% polymer; 0-10% surfactant; and 0-3% other trace materials.

The system may include composition of matter being mixed with a water stream comprising about 0 to about 80,000 ppm total dissolved solids. The resultant mixture may result in the water stream being characterized by improved friction reduction and/or viscosity building. The resultant mixture may be injected or otherwise transferred from a surface facility (or related equipment) into a wellbore. The resultant mixture may have other constituents added, such as sand or other proppant types.

The oil phase may include or otherwise be prepared by use of sorbitan monooleate and primary surfactant having a weight ratio to each other from about 40:60 to about 60:40. In aspects, the weight ratio may be about 49:51 to about 51:49.

The system may produce the polymer of the composition as an acrylamide-based copolymer having a molecular weight distribution of about 10 million Daltons to about 30 million Daltons.

The bulk average diameter of the micelles may be about 0.5 microns to about 0.6 microns.

The secondary surfactant may have an HLB in a range of about 10 to about 15.

The system may include use an oil-soluble AZO initiator and one or more monomers. A weight percent ratio of the oil-soluble AZO initiator to total monomer may be in the range of about (0.01-0.05):1.

The polymerization reactor may be configured and controlled to a suitable residence reaction time range of about 0.01 minutes to about 5 minutes.

Yet still other embodiments of the disclosure provide for a system for making a composition of matter that may include a neutralization reactor configured to produce a neutralization product. The neutralization reactor may be operated under pressure. The neutralization reactor may be controlled to a neutralization reaction temperature in the range of about 65° F. to about 70° F. The system may include an oil phase mixer configured to mix an oil-based material, sorbitan monooleate, and a primary surfactant. The sorbitan monooleate and primary surfactant may have a weight ratio to each other from about 40:60 to about 60:40.

The system may include an aqueous phase mixer configured to receive the neutralization product. The aqueous phase mixer may be operated to process or otherwise mix the neutralization product with a monomer solution to form an aqueous phase product. The aqueous phase mixer may be controlled to produce the aqueous phase product having a pH of about 6.9 to about 7.1.

The system may include an emulsifier configured to receive and emulsify the oil phase product with the aqueous phase product in order to form a water-in-oil emulsification. The emulsification may be characterized as having oil as a continuous phase and water as a dispersed phase.

The system may include a homogenizer configured to receive the water-in-oil emulsification. The homogenizer may be configured to process and otherwise form an emulsification product. The emulsification product may have micelles having a bulk average diameter of about 0.1 microns to about 1 micron.

The system may include a polymerization reactor. The reactor may be fed the emulsification product and an initiator. Reaction within the reactor may yield a polymerization reaction product. The polymerization reactor may be operated and otherwise controlled at a polymerization reaction temperature in the range of about 175° F. to about 240° F.

The system may include an inversion vessel. The vessel may be configured to mix or otherwise process a secondary surfactant with the polymerization reaction product in order to produce the composition of matter.

The composition of matter may include by weight percent about: 15-25% oil phase; 35-50% water; 20-35% polymer; 0-10% surfactant; and 0-3% other trace materials.

In aspects, a weight percent of total constituents used in the system may include about 19-22% hydrocarbonaceous fluid; 1.5-2.0% blend of 40:60 to 60:40 by weight ratio sorbitan monooleate to primary surfactant; 5-13% ice; 5-12% acrylic acid; 4-10% of 28% ammonia; 0.05-0.15% chelating agent; 0.05-0.15% sodium bromate; 6-17% water; 30-40% of 53% acrylamide; 0.01-1% of 0.8% sodium metabisulfate; 0.1-0.5 AZO initiator; 0.4-0.5% of 32% sodium metabisulfate; and 4-5% secondary surfactant.

The blend weight ratio to each other may be about 50:50.

The polymer of the composition may be an acrylamide-based copolymer having a molecular weight distribution of about 10 million Daltons to about 30 million Daltons. In aspects, the system may be operated to provide the bulk average diameter of the micelles of about 0.5 microns to about 0.6 microns.

The secondary surfactant may have an HLB in a range of about 10 to about 15.

The polymerization reaction may occur by way of use an AZO initiator and monomer. In aspects, a weight percent ratio of the AZO initiator to monomer is in the range of about (0.01-0.05):1.

The aqueous phase product may be the neutralization product mixed with water and the monomer solution. The neutralization product may be at least 99% ammonium acrylate. The monomer solution may include acrylamide.

In aspects, a weight percent of total constituents used through the system may be about: 19-22% hydrocarbonaceous fluid; 1.5-2.0% blend of 40:60 to 60:40 by weight ratio sorbitan monooleate to primary surfactant; 5-13% ice; 5-12% of an acid; 4-10% of a base; 0.05-0.15% chelating agent; 0.05-0.15% of a bromate material; 6-17% water; 30-40% of an amide material; 0.01-1% a sulfite material of a first concentration; 0.1-0.5 initiator having the functional group R—N=N—R'; 0.4-0.5% of a sulfite material of a second concentration; and 4-5% secondary surfactant.

In aspects, a weight percent of total constituents used through the system to make the composition may include about: 19-22% hydrocarbonaceous fluid; 1.5-2.0% blend of 40:60 to 60:40 by weight ratio sorbitan monooleate to primary surfactant; 5-13% ice; 5-12% acrylic acid; 4-10% of 28% ammonia; 0.05-0.15% chelating agent; 0.05-0.15% sodium bromate; 6-17% water; 30-40% of 53% acrylamide; 0.01-1% of 0.8% sodium metabisulfate; 0.1-0.5 AZO initiator; 0.4-0.5% of 32% sodium metabisulfate; and 4-5% secondary surfactant.

Figure 1:
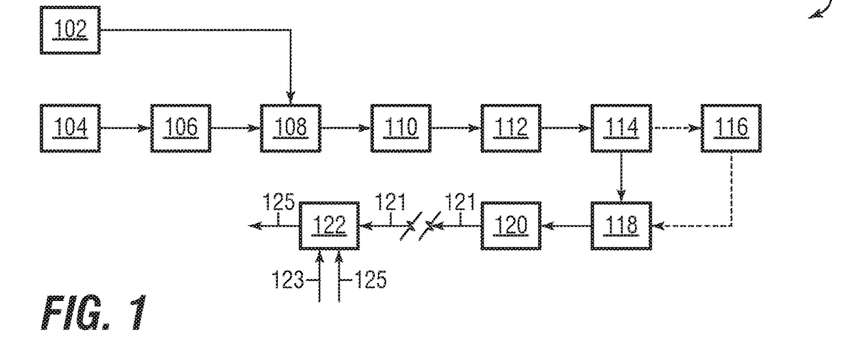
FIG. 1 shows an overview flow diagram of a process for making a composition of matter according to embodiments of the disclosure.

Referring now to FIG. 1, an overview flow diagram of a process for making a composition of matter, in accordance with embodiments disclosed herein, is shown. FIG. 1 illustrates a process suitable for making a chemical blend product 121 that may be polymeric-based. The blend product 121 may equivalently be referred to as 'final product', 'composition of matter', and other comparable variations. The composition of matter may be a polymeric-based frac fluid additive.

In this respect the chemical blend 121 may be a composition of matter that includes a polymer. Although the use of the chemical blend 121 is not meant to be limited, the blend 121 may be suitable for use as an additive into a water stream (or 'frac water') 123, subsequently forming a frac fluid 125. One of skill in the art would appreciate that the term 'frac fluid' can have a wide meaning, but typically entails a liquid stream—largely water—with various additives added (mixed) therein that is then pumped or injected into a subterranean formation. In aspects, the blend 121 may be added into the frac fluid 125. The blend 121 added may be in liquid or solid form.

The blend 121 may be added into the water stream 123 in any manner known in the art, including 'onsite' at a surface facility associated with a frac operation. The blend 121 may be characterized as being a friction-reducer whereby the resultant frac fluid 125 may have lower or reduced friction losses as compared to what the fluid 125 would be without the blend 121. The blend 121 may be characterized as being a viscosity builder, whereby the resultant frac fluid 125 may have greater proppant carrying capability as compared to what the fluid 125 would be without the blend 121. In aspects, the blend 121 may be synergistically characterized as being both a friction reducer and a viscosity builder.

The process 100 has been successfully utilized to make the desirous blend 121 from an inverse emulsion polymerization reaction as described herein. As shown, the process 100 may include a first step of an oil phase preparation 102. The oil phase preparation step 100 results in an oil phase stream that may be fed to an emulsification step 108. One of skill in the art would appreciate the oil phase stream may be transferred to the emulsification step 108 in any suitable manner known in the art, such as by pump, pressurized transfer line, gravity feed, and so forth.

Oil Phase Preparation

Oil phase preparation step 102 may include mixing an oil-based material with other materials, which may include materials useful for emulsification, polymerization, and so forth. The oil-based material may be hydrocarbonaceous in nature, thus being a material with CH bonds. Although not meant to be limited, the oil-based material may be a mineral oil, kerosene, or any other hydrocarbonaceous material useful in the making of a water-in-oil emulsion. An example of a suitable commercially available oil-based material includes LPA-210 or other LPA solvent by Sasol Chemicals LLC.

Emulsification of the oil-phase and the water-phase may be aided by use of a surfactant or surfactant blend. In this respect a surfactant blend may include a primary surfactant mixed (blended, etc.) with other materials prior to being mixed with the oil-based material. Accordingly, oil phase preparation step 102 may include mixing a primary surfactant with one or more materials. Step 102 may further include mixing the primary surfactant blend with the oil-based material.

The primary surfactant is not meant to be limited, and any surfactant (or 'emulsifier') suitable for making a water-in-oil emulsion may be contemplated. In embodiments, the primary surfactant may be non-ionic and oil-soluble. In embodiments, the primary surfactant may be polymeric-based or polymer-derivative. The primary surfactant may include or be a polyisobutylene succinic acid (or anhydride) derivative. The primary surfactant may be an oligomeric ester. An example of a suitable commercially available primary surfactant includes Hypermer 2524 by Croda International.

Other materials that may be premixed with the primary surfactant include sorbitan monooleate ("SMO"). The use of SMO may help lower the cost of the system without sacrificing quality. SMO may also help the product to invert more easily, whereby less "breaker" surfactant may be needed at the end.

The resultant oil-phase-surfactant blend may then be fed (i.e., transferred, pumped, etc.) to emulsification step 108 where it may be mixed with a water-phase blend having one or more monomers. Thus, the process 100 may include water phase preparation step 106. However, one of the materials useful for the water preparation step 106 may be a resultant from a precursor neutralization step 104. This may include a batch process, whereby the aqueous phase is added, then the oil phase, then emulsification, then transfer from the vessel, and repeat.

Neutralization

Neutralization step 104 may include an acid-base reaction, whereby an acid and a base react to form water and a salt(s), with other remnants. The neutralization reaction may occur in a neutralization reactor as would be known to one of skill in the art. The reactor may be maintained under pressure or sealed, including for environmental reasons (such as to avoid release of ammonia to the atmosphere).

Although not meant to be limited to any particular acid, suitable acid examples include carboxylic acids (saturated or unsaturated), such as acrylic acid (or propanoic acid). Similarly, although not meant to be limited to any particular base, suitable base examples include those known to be useful for a neutralization reaction with carboxylic acid, such as ammonia (or aqueous ammonia) or other amine derivative. A suitable commercial example of carboxylic acid includes acrylic acid CAS No. 79-10-7. A suitable commercial example of ammonia is ~28-30% ammonia solution CAS No. 1336-21-6 available from Sigma-Aldrich or other comparable manufactures/distributors.

Neutralization step 104 may result in the production of a salt and other functional groups, such as amides. For example, the neutralization between acrylic acid and ammonia solution may result in the production of an acrylate (e.g., ammonium acrylate), which may be suitable for use as a first monomer in polymerization step 114.

Neutralization of an acid such as acrylic acid may result in high temperatures, which may promote undesirable polymerization in step 104. However, a slow and time-consuming reaction via lower temperatures is also undesired. As such, a balance may be achieved by using cooling or a coolant medium in step 104. For example, ice may be added (such as from a hopper/auger) into the neutralization step 104. The use of ice may be beneficial to avoid the need of further cooling requirements, and may keep reaction (or residence) times down to about 5-10 minutes. In addition or in the alternative a coil may extend into the reaction tank, and have a medium such as chilled water circulated therethrough. The cooling may be controlled to provide a desired temperature or temperature range. In embodiments, the temperature of the neutralization reaction/reactor of step 104 may be controlled to be in a range of about 70° F. to about 80° F. Control may be accomplished in a standard manner, such as the use of thermocouple (and related wiring) and respective controller logic, computer software, and so forth.

Water Phase Preparation

The resultant products, or parts thereof, of the neutralization step 104 may be fed to the water-phase preparation step 106. In embodiments, the product stream from step 104 fed to the water-phase preparation step may be 99% (or more) by weight ammonium acrylate. Trace elements may include ammonia and ammonia solution.

In embodiments, it may be desirous for polymerization step 114 to produce a copolymer (e.g., an acrylate/acrylamide copolymer). In this respect, other monomers may be added into the water-phase. For example, a second monomer may be added. The second monomer may have an amide functional group, such as acrylamide. A suitable commercially available chemical may be 53% aqueous acrylamide (or "Acrylamide 53") available from Parchem Fine & Specialty Chemicals, 30-50% aqueous acrylamide from BASF, or other suitable concentrations from comparable manufacturer(s)/distributor(s).

Some polymers may not be as soluble in water. For example, polyacrylamide is non-ionic, and may be less suitable on its own for use with process 100. On the other hand, polyacrylate is ionic, but is very sensitive. But as discussed herein an acrylate/acrylamide-based copolymer provides a synergistic effect to the process 100.

Other materials that may be added during the water-phase preparation step may include water, an oxidant, an antioxidant, a chelating agent, a polymerization initiator(s), and so forth. The chelating agent may be a DTPA-based material, such as diethylenetriamine-pentaacetic acid pentasodium salt solution (CAS No. 140-01-2). An example of a suitable commercially available chelating agent may be Versenex 80 from the Dow Chemical Company, which may be in aqueous solution at varied concentration. An example oxidant includes sodium bromate (CAS No. 7789-38-0), which may be in aqueous solution at varied concentration. An example antioxidant includes sodium metabisulfite (or 'SMBS') (CAS No. 7681-57-4), which may be in aqueous solution at varied concentration.

The water-phase preparation step 106 may include use of equipment suitable for forming the desired water-phase, such as a mixing tank with agitation. In embodiments, it may be desirous to quality check the water-phase via sensor or other suitable measurement. For example, it may be desirous to take a lab sample and check with a pH stick or meter. In this respect the water-phase preparation step 106 may include sample analysis and control to ensure a pH level of about 6.5 to about 7.5. In embodiments, the pH level of the resultant water-phase product (fed to emulsification step 108) may be controlled to about 6.9 to about 7.1. To control pH, the amount of acid or base may be varied. For example, the amount of ammonium solution introduced at step 104 can be increased or decreased.

Emulsification

Once prepared, the water-phase may then be inverted or emulsified into the oil-phase in emulsification step 108. This step may be carried out in a mixing tank, which may include standard agitation for homogenization of the water-in-oil emulsification. The hydrophobic-hydrophilic property of the primary surfactant results in the water mixing in the oil.

A first matter of significance is that it may be useful to first add the oil phase, and then next add the water phase. A two-step approach may be useful for forming a better emulsion that ultimately yields a higher quality final product blend 121. In this respect, emulsification step 108 may first be a pseudo continuous batch process (e.g., oil phase added, water phase added, water-in-oil emulsion formed, tank emptied, repeat) that forms the initial emulsification product.

The water-in-oil emulsion may then be transferred to a secondary mixing step 110. The secondary mixing step 110 may utilize suitable equipment for ensuring a desired micelle size is achieved in the emulsion, such as an inline high-shear mixer or homogenizer. The product stream eventually feed to deaeration step 112 may have micelles with a bulk average diameter of about 0.1 microns to about 1 micron.

In embodiments the secondary mixing step 110 may result in the water-in-oil emulsification having micelles with a bulk average diameter of about 0.5 microns to about 0.6 microns. There may be a relationship between micelle size (i.e., diameter) and the quality of final composition 121. Micelle size may be checked, such as sample and lab test, with adjustment to process 100 in any manner necessary to ensure desired size is achieved. One type of measurement may be of the bulk viscosity of the emulsification product. One of skill would appreciate that the larger the micelle size, the lower the bulk viscosity (or vice versa).

O2 Removal and Polymerization Reaction

From secondary mixing step 110 the water-in-oil emulsification product may be fed to a deaeration step 112. As polymerization may be impeded by the presence of oxygen, the deaeration step 112 may be used to ensure O2 removal. This may prevent or otherwise mitigate any O2 from reacting with any radicals used to initiate polymerization. The deaeration step 112 may include purging (or bubbling) an N2 stream through the emulsification product, and then using a vacuum as a pull on any O2 gas. A dissolved oxygen meter may be used to check whether O2 levels meet specification, including to the ppb level.

The deaerated water-in-oil emulsification product may then be fed or transferred to the polymerization reaction step 114. A reduction agent such as SMBS may also be fed to reaction step 114. The reaction step 114 may be carried out in any suitable reaction vessel, such as a tube reactor, plug flow reactor, and so forth. The reaction step 114 may further include various operational control and agitation. In these conditions the bromate may act as an oxidizer. The SMBS and sodium bromate may react together in a manner that generates heat in a sufficient manner to break down the polymer initiator to form the radicals used to initiate polymerization.

Another matter of significance is the ratio of the surfactant blend between the primary surfactant and SMO that is mixed into the oil phase during step 102. In embodiments, an oil-phase surfactant blend ratio may be about a 50/50 SMO/primary surfactant blend by weight. In embodiments, the surfactant blend ratio may be between about a 40/60 SMO/primary surfactant blend by weight to about 60/40 SMO/primary surfactant blend by weight.

It has been discovered that a significant quantity of the primary surfactant of embodiments herein may be helpful to stabilize the formed emulsion to a much higher degree whereby the surfactant blend may contain a polymeric component that may be adsorbed on the particle surface and provides steric stabilization. The polymeric component may have multiple points of interaction between the aqueous and organic phases. These multiple interactions may provide greater mechanical stability to the system.

The stabilization of the emulsification may then have a direct link on how high of a temperature may be used in a polymerization reaction step 114, without cause to worry about whether the emulsification will break down. Thus, even at high temperatures, the polymerization reaction may continue to occur in the micelle. By being able to maintain high temperatures, the emulsification polymerization reaction may occur at a faster rate, thereby significantly reducing standard reaction times.

Reaction temperature may generally increase as a result of the heat of reaction of the polymerization. Although higher reaction temperatures may be desired and useful, care may be needed to ensure the temperature does not exceed a limit. Accordingly, polymerization step 114 may include an associated cooling process (or heat removal).

Excess or uncontrolled temperature during polymerization may have a direct impact on the quality of final composition 121. Too high of a temperature may lead to too high of reaction rate. The impact (reduction) on quality may be seen as a final product composition 121 that has less ability to be viscosity building and/or less ability to reduce friction for a frac operation. The polymerization step 114 may be carried out a reaction temperature of about 175° F. to about 240° F. In embodiments, the reaction temperature may be in the range of between about 180° F. to about 230° F.

Beneficially this temperature range promotes fast reaction times, which reduces overall process and production time normally associated with other emulsion polymerization processes. Faster and hotter polymerization may be aided by being able to add the initiator into the water-phase prior to emulsification step 108.

In accordance with embodiments herein polymerization step 114 may occur without crosslinking. Generally speaking a linear (co)polymer may be easily stretched out in the presence of water, which may provide a preferred quality over that of branched polymers. Branched polymers tend to 'curl' and are not as useful because of the shortened chain length. With respect to viscosity-building capability for frac fluid 125, longer chains are superior.

The polymerization step 114 may result in formation of a high molecular weight (co)polymer. In embodiments, the molecular weight distribution of the polymer component of final product 121 may be in the range of about 10 million to 30 million daltons.

The polymerization step 114 may be emulsification polymerization because of desired benefits attributable thereto. In this respect, the presence of an oil-phase helps reduce or eliminate detrimental bulk polymerization. In bulk polymerization radicals have free access to micelles, and so the ratio of radical-to-micelles (and the control thereof) becomes critical. With emulsification step 114, the surfactant blend (and thus the surfactant) may control the interaction of the radical with the micelle, and so greater overall control of polymerization may be achieved. In embodiments, it may be useful to have an initiator-to-monomer ratio (by weight percent) of a desired amount. For example, there may be an AZO initiator-to-total monomer ratio (wt %/wt %) of about 0.01-0.05/1. The AZO initiator may beneficially be oil soluble.

Oil-Water Inversion

The resultant product from polymerization step 114 may be a water-in-oil polymer-based stream. For convenience the product may be referred to as an intermediate. Although it may not be necessary, the polymer-based product stream may be stored via an intermediate storage step 116. The polymer-based product may thus be fed from the polymerization step 114 and/or the intermediate storage step 116 to an inversion step 118.

The inversion step 118 may include the addition of a secondary surfactant. The inversion step 118 may be carried out in a standard mixing tank or comparable equipment. Although inversion time may be fairly instantaneous, there may be upwards of about 5 minutes residence time for the inversion.

The secondary surfactant may be a 'breaker' or 'inversion' surfactant. As one of skill would appreciate this type of surfactant 'breaks' the water phase out of the oil phase. The secondary surfactant may have an HLB value in the range of about 10 to about 15. A suitable secondary surfactant may be a methoxylate-based surfactant. An example of a commercially available breaker surfactant usable in accordance with embodiments here may be of the Hypinvert series from Croda International PLC (e.g., Hypinvert 3220).

Upon completion of the inversion step 118, and any applicable separation process, the inversion product stream may be fed to a final storage step 120. The final composition of matter 121 may ultimately be useful as an additive for forming a frac fluid, and may synergistically have the ability to be either usable as a friction reducer, a viscosity builder, or characteristics of each.

Final Product

As shown the final blend product 121 may be mixed with a water stream 123. The blend 121 may be referred to as a composition of matter. The water stream 123 may be any type of water (e.g., river water, fresh water, sea water, produced water, etc.) suitable for forming the frac fluid 125. Although not meant to be limited, typically the water-additive mixing step 122 may occur onsite at a frac operation. One of skill would appreciate the mixing step 122 may occur an inline matter where the resultant frac fluid 125 is immediately injected (pumped) into the wellbore. Just the same, the frac fluid 125 may be maintained in a storage tank. It is within the scope of the disclosure that the composition of matter stream 121 may be further processed, treated, etc. prior to the mixing step 122.

The blend product stream 121 may have a composition of remnant oil phase, water, (co)polymer, surfactant, and other trace materials. The composition (by weight percent) may be about: 15-25% oil phase; 35-50% water; 20-35% (co)polymer; 0-10% surfactant(s); and 0-3% other trace materials.

The concentration of the blend 121 (which may be in the form of liquid, liquidous, slurry, or dry solid) in the frac fluid 125 may determine the traits associated with the frac fluid. Moreover, the amount of the neutralization acid (e.g., acrylic acid) may have an effect on the 'charge' associated with the final blend 121. For example, if higher amounts of neutralization acid are used, the blend 121 may tend to be more anionic, and thus more soluble in water. But this may make the blend 121 more effected by salinity. Thus, the blend 121 desired may depend on the salinity of the water stream 123 available for the frac operation. In embodiments, the blend 121 may be suitable for a salinity value of the water stream 123 in the range of about 0 to about 80,000 ppm total dissolved solids.

Figure 2:
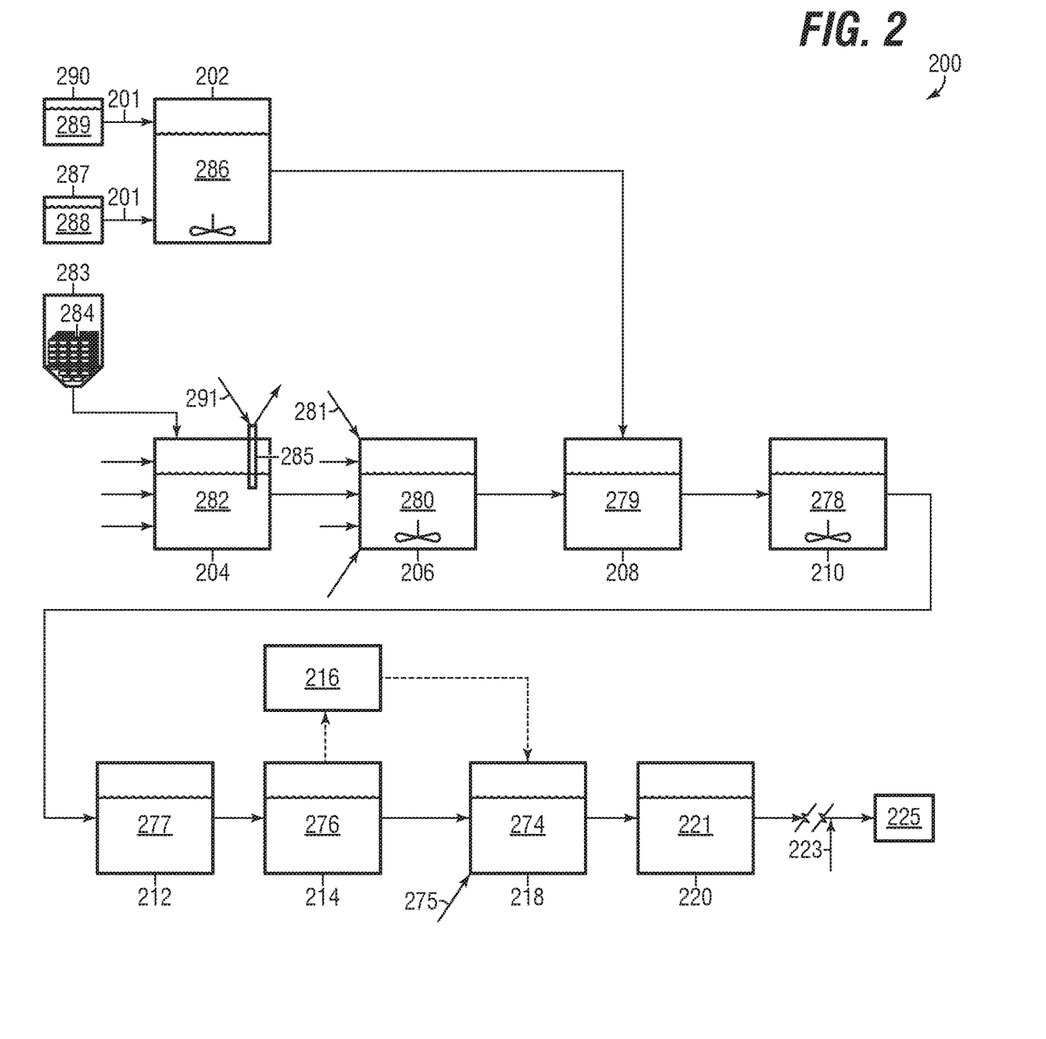
FIG. 2 shows a process flow diagram of a system for making a composition of matter according to embodiments of the disclosure.

Referring now to FIG. 2, a process flow diagram of a system for making a composition of matter, in accordance with embodiments disclosed herein, is shown. FIG. 2 illustrates an operative system 200 suitable for the process shown in FIG. 1 (and as described in the accompanying text). The composition of matter may be polymeric-based frac fluid additive. Unless expressed otherwise, aspects of system 200 may be like that of the process 100, and thus may only be described in brevity. For example, system 200 may be operated to provide or otherwise produce a chemical blend product 221 that may be polymeric-based and like that of blend 121. The blend product 221 may equivalently be referred to as 'final product', 'composition of matter', and other comparable variant nomenclature. However, that is not to say that system 200 may not have differences from that of the process.

In aspects, the blend product 221 may be added into a frac fluid. The blend 221 added may be in liquid or solid form.

The blend 221 may be added into a water stream in any manner known in the art, including 'onsite' at a surface facility associated with a frac operation. The blend 221 may be characterized as being a friction-reducer whereby the resultant frac fluid may have lower or reduced friction losses as compared to what the fluid would be without the blend 221. The blend 221 may be characterized as being a viscosity builder, whereby the resultant frac fluid may have greater proppant carrying capability as compared to what the fluid would be without the blend 221. In aspects, the blend 221 may be synergistically characterized as being both a friction reducer and a viscosity builder.

Oil Phase Preparation

Oil phase preparation may include mixing an oil-based material with other materials, which may include materials useful for emulsification, polymerization, and so forth. The oil-based material 289 may be hydrocarbonaceous in nature, thus being a material with CH bonds. An example of a suitable commercially available oil-based material includes LPA-210 or other LPA solvent by Sasol Chemicals LLC. The oil-based material 289 may be fed to an oil phase prep mixer 202, such as via transfer lines 201 that provide fluid communication between the mixer 202 and an oil-based material source 290. The source 290 may be a supply tank.

Emulsification of the oil-phase and the water-phase may be aided by use of a surfactant or surfactant blend 288. The surfactant blend 288 may be fed to an oil phase prep mixer 202, such as via transfer lines that provide fluid communication between the mixer 202 and a surfactant blend source 287. The blend source 287 may be a supply tank.

In this respect the surfactant blend 288 may include a primary surfactant mixed (blended, etc.) with other materials prior to being mixed with the oil-based material 289. Accordingly, oil phase preparation may include mixing a primary surfactant with one or more materials, and may further include mixing the primary surfactant blend 288 with the oil-based material 289 in the oil phase prep mixer 202. The prep mixer may be a standard agitation mixing tank suitable for the processing of oil-based materials and surfactants.

The resultant oil-phase-surfactant blend 286 may then be fed (i.e., transferred, pumped, etc.) to an emulsifier 208 where it may be mixed with a water-phase blend having one or more monomers. Thus, the system 200 may include water phase preparation.

Neutralization

Neutralization reactor 204 may suitable for the handling of an acid-base reaction, whereby an acid and a base react to form water and a salt(s), with other remnants. The neutralization reaction may occur in the neutralization reactor 204 as would be known to one of skill in the art. The reactor 204 may be maintained under pressure or sealed, including for environmental reasons (such as to avoid release of ammonia to the atmosphere). The reactor 204 may be configured with temperature control, such as via the use of one or more thermocouples and a controller. Thus, the reactor 204 may be associated with cooling that may be controlled to provide a desired temperature or temperature range.

There may be an internal temperature control device (such as a coil) 285 configured for monitoring and controlling the reaction temperature, and thus the temperature of the reactor 204. The device 285 may have a medium 291 such as chilled water circulated therethrough. Control of the reaction temperature may help eliminate or mitigate undesired polymerization. However, a slow and time-consuming reaction via lower temperatures is also undesired. The reactor 204 may be controlled to provide a temperature (or reaction temperature) of about 50° F. to about 100° F. The temperature may be about 65° F. to about 70° F. Control may be accomplished in a standard manner, such as the use of thermocouple (and related wiring) and respective controller logic, computer software, and so forth. The reaction or residence time of reactor 204 may be about 5 minutes to about 10 minutes.

Temperature control may also be aided by using other cooling or a coolant medium. In aspects, the coolant medium 284 may be ice (including cubed, shaved, ice slurry, and so forth), which may be fed to the reactor 204 via a hopper 283.

Although not meant to be limited to any particular acid, suitable acid examples include carboxylic acids (saturated or unsaturated), such as acrylic acid (or propanoic acid). Similarly, although not meant to be limited to any particular base, suitable base examples include those known to be useful for a neutralization reaction with carboxylic acid, such as ammonia (or aqueous ammonia) or other amine derivative. A suitable commercial example of carboxylic acid includes acrylic acid CAS No. 79-10-7. A suitable commercial example of ammonia is ~28-30% ammonia solution CAS No. 1336-21-6 available from Sigma-Aldrich or other comparable manufactures/distributors.

The neutralization reaction may result in a neutralization product 282 that may include a salt and other functional groups, such as amides. For example, the neutralization between acrylic acid and ammonia solution may result in the production of an acrylate (e.g., ammonium acrylate), which may be suitable for use as a first monomer in polymerization.

Water Phase Preparation

The resultant product 282, or parts thereof, from the neutralization reactor 204 may be fed to a water-phase preparation mixing tank 206. In embodiments, the product 282 fed to the water-phase preparation step may be 99% (or more) by weight ammonium acrylate. Trace elements may include ammonia and ammonia solution.

In embodiments, it may be desirous to produce a copolymer (e.g., an acrylate/acrylamide copolymer). In this respect, other monomers may be added into the water-phase. For example, a second monomer 281 may be added. The second monomer 281 may have an amide functional group, such as acrylamide. A suitable commercially available chemical may be 53% aqueous acrylamide (or "Acrylamide 53") available from Parchem Fine & Specialty Chemicals, 30-50% aqueous acrylamide from BASF, or other suitable concentrations from comparable manufacturer(s)/distributor(s).

Some polymers may not be as soluble in water. For example, polyacrylamide is non-ionic, and may be less suitable on its own for use with system 200. On the other hand, polyacrylate is ionic, but is very sensitive. But as discussed herein an acrylate/acrylamide-based copolymer provides a synergistic effect.

Other materials that may be added to the water-phase preparation mixer 206 may include water, an oxidant, an antioxidant, a chelating agent, a polymerization initiator(s), and so forth. The chelating agent may be a DTPA-based material, such as diethylenetriamine-pentaacetic acid pentasodium salt solution (CAS No. 140-01-2). An example of a suitable commercially available chelating agent may be Versenex 80 from the Dow Chemical Company, which may be in aqueous solution at varied concentration. An example oxidant includes sodium bromate (CAS No. 7789-38-0), which may be in aqueous solution at varied concentration. An example antioxidant includes sodium metabisulfite (or 'SMBS') (CAS No. 7681-57-4), which may be in aqueous solution at varied concentration.

The water-phase preparation mixing tank may be configured to provide agitation. In embodiments, it may be desirous to quality check the water-phase via sensor or other suitable measurement. For example, it may be desirous to take a lab sample and check with a pH stick or meter. In this respect the preparation of water-phase product 280 may include sample analysis and control to ensure a pH level of about 6.5 to about 7.5. In embodiments, the pH level of the resultant water-phase product 280 (fed to emulsifier 208) may be controlled to about 6.9 to about 7.1. To control pH, the amount of acid or base may be varied. For example, the amount of ammonium solution introduced at step 104 can be increased or decreased.

Emulsification

Once prepared, the water-phase product 280 may then be inverted or emulsified into the oil-phase product 286 in the emulsifier 208. The emulsifier 208 may be a mixing tank, which may include standard agitation for homogenization of the water-in-oil emulsification. The hydrophobic-hydrophilic property of the primary surfactant results in the water mixing in the oil.

A first matter of significance is that it may be useful to first add the oil phase, and then next add the water phase. A two-step approach may be useful for forming a better emulsion product 279 that ultimately yields a higher quality final product blend 221. In this respect, the emulsifier 208 may be configured or otherwise operated as a pseudo continuous batch reactor (e.g., oil phase added, water phase added, water-in-oil emulsion formed, tank emptied, repeat) that forms the initial emulsification product 279.

The water-in-oil emulsion 279 may then be transferred to a secondary mixer 210. The secondary mixer 210 may be configured to provide and ensure a desired micelle size is achieved in the emulsion. The mixer 210 may be an inline high-shear mixer or homogenizer. The final mixed emulsion product 278 stream eventually feed to deaerator 212 may have micelles with a bulk average diameter of about 0.1 microns to about 1 micron.

In embodiments the secondary mixer 210 may provide the water-in-oil emulsification product 279 having micelles with a bulk average diameter of about 0.5 microns to about 0.6 microns. There may be a relationship between micelle size (i.e., diameter) and the quality of final blend product 221. Micelle size may be checked, such as sample and lab test, with adjustment to system 200 in any manner necessary to ensure desired size is achieved. One type of measurement may be of the bulk viscosity of the emulsification product 279. One of skill would appreciate that the larger the micelle size, the lower the bulk viscosity (or vice versa).

O2 Removal and Polymerization Reaction

From the secondary mixing mixer 210, the water-in-oil emulsification product 279 may be fed to a deaerator. As polymerization may be impeded by the presence of oxygen, the deaerator 212 may be configured and operated to ensure O2 removal. This may prevent or otherwise mitigate any O2 from reacting with any radicals used to initiate polymerization. The deaerator 212 may include purging (or bubbling) an N2 stream through the emulsification product, and then using a vacuum as a pull on any O2 gas. A dissolved oxygen meter may be used to check whether O2 levels meet specification, including to the ppb level.

The deaerated water-in-oil emulsification product 277 may then be fed or transferred to a polymerization reactor 214. A reduction agent such as SMBS may also be fed to the polymerization reactor 214. The reactor 214 may be any suitable reaction vessel, such as a tube reactor, plug flow reactor, and so forth. The reactor 214 may be configured or operably associated with various operational control and agitation. In these conditions the bromate may act as an oxidizer. The SMBS and sodium bromate may react together in a manner that generates heat in a sufficient manner to break down the polymer initiator to form the radicals used to initiate polymerization within the reactor 214.

Another matter of significance is the ratio of the surfactant blend between the primary surfactant and SMO that is mixed into the oil phase. In embodiments, an oil-phase surfactant blend ratio may be about a 50/50 SMO/primary surfactant blend by weight. In embodiments, the surfactant blend ratio may be between about a 40/60 SMO/primary surfactant blend by weight to about 60/40 SMO/primary surfactant blend by weight.

It has been discovered that a significant quantity of the primary surfactant of embodiments herein may be helpful to stabilize the formed emulsion to a much higher degree whereby the surfactant blend may contain a polymeric component that may be adsorbed on the particle surface and provides steric stabilization. The polymeric component may have multiple points of interaction between the aqueous and organic phases. These multiple interactions may provide greater mechanical stability to the system.

The stabilization of the emulsification may then have a direct link on how high of a temperature may be used in polymerization reactor 214, without cause to worry about whether the emulsification will break down. Thus, even at high temperatures, the polymerization reaction may continue to occur in the micelle. By being able to maintain high temperatures, the emulsification polymerization reaction may occur at a faster rate, thereby significantly reducing standard reaction times.

Reaction temperature may generally increase as a result of the heat of reaction of the polymerization. Although higher reaction temperatures may be desired and useful, care may be needed to ensure the temperature does not exceed a limit. Accordingly, the reactor 214 may include an associated cooling process (or heat removal).

Excess or uncontrolled temperature during polymerization may have a direct impact on the quality of final blend product 221. Too high of a temperature may lead to too high of reaction rate. The impact (reduction) on quality may be seen as a final product composition that has less ability to be viscosity building and/or less ability to reduce friction for a frac operation. The polymerization within reactor 214 may be carried out a reaction temperature of about 175° F. to about 240° F. The polymerization within reactor 214 may be carried out a reaction temperature in a range of about 180° F. to about 230° F.

Beneficially this temperature range promotes fast reaction times, which reduces overall process and production time normally associated with other emulsion polymerization processes. Faster and hotter polymerization may be aided by being able to add the initiator into the water-phase prior to emulsifier 208.

In accordance with embodiments herein polymerization with the reactor 214 may occur without crosslinking. Generally speaking a linear (co)polymer may be easily stretched out in the presence of water, which may provide a preferred quality over that of branched polymers. Branched polymers tend to 'curl' and are not as useful because of the shortened chain length. With respect to viscosity-building capability for a frac fluid, longer chains are superior.

The polymerization reaction may result in formation of a high molecular weight (co)polymer product 276. In embodiments, the molecular weight distribution of the polymer component of final product 221 may be in the range of about 10 million to 30 million daltons.

The polymerization reaction may be an emulsification polymerization because of desired benefits attributable thereto. In this respect, the presence of an oil-phase helps reduce or eliminate detrimental bulk polymerization. In bulk polymerization radicals have free access to micelles, and so the ratio of radical-to-micelles (and the control thereof) becomes critical. With polymerization, the surfactant blend (and thus the surfactant) may control the interaction of the radical with the micelle, and so greater overall control of polymerization may be achieved. In embodiments, it may be useful to have an initiator-to-monomer ratio (by weight percent) of a desired amount. For example, there may be an AZO initiator-to-total monomer ratio (wt %/wt %) of about 0.01-0.05/1. The AZO initiator may beneficially be oil soluble.

Oil-Water Inversion

The resultant polymerization product 276 may be a water-in-oil polymer-based stream. For convenience, the product 276 may be referred to as an intermediate. Although it may not be necessary, the polymer-based product stream 276 may be stored via an intermediate storage tank (or other suitable vessel) 216. The polymer-based product 276 may thus be fed from the polymerization reactor 214 and/or the intermediate storage 216 to an inversion tank 218.

An additional secondary surfactant 275 may be fed to the inversion tank 218. The inversion tank 216 may be a standard mixing tank or comparable equipment. Although inversion time may be fairly instantaneous, there may be upwards of about 5 minutes residence time for the inversion.

The secondary surfactant 275 may be a 'breaker' or 'inversion' surfactant. As one of skill would appreciate this type of surfactant 'breaks' the water phase out of the oil phase. The secondary surfactant 275 may have an HLB value in the range of about 10 to about 15. A suitable secondary surfactant may be a methoxylate-based surfactant. An example of a commercially available breaker surfactant usable in accordance with embodiments here may be of the Hypinvert series from Croda International PLC (e.g., Hypinvert 3220).

Upon completion of the inversion, and any applicable separation process, an inversion product stream 274 may be fed to a final storage 220. The final composition of blend product 221 ultimately useful as an additive for forming a frac fluid may synergistically have the ability to be either usable as a friction reducer, a viscosity builder, or characteristics of each.

Final Product

As shown the final blend product 221 may be mixed with a water stream 223. The water stream 223 may be any type of water (e.g., river water, fresh water, sea water, produced water, etc.) suitable for forming the frac fluid 225. Although not meant to be limited, typically the water-additive mixing may occur onsite at a frac operation. One of skill would appreciate the mixing may occur an inline matter where the resultant frac fluid 225 is immediately injected (pumped) into the wellbore. Just the same, the frac fluid 225 may be maintained in a storage tank. It is within the scope of the disclosure that the composition of blend product 221 may be further processed, treated, etc. prior to the mixing with water 223.

The composition of the blend product 221 may have a composition of remnant oil phase, water, (co)polymer, surfactant, and other trace materials. The composition (by weight percent) may be about: 15-25% oil phase; 35-50% water; 20-35% (co)polymer; 0-10% surfactant(s); and 0-3% other trace materials.

The concentration of the blend product 221 (which may be in the form of liquid, liquidous, slurry, or dry solid) in the frac fluid 225 may determine the traits associated with the frac fluid. Moreover, the amount of the neutralization acid (e.g., acrylic acid) may have an effect on the 'charge' associated with the final blend 221. For example, if higher amounts of neutralization acid are used, the blend product 221 may tend to be more anionic, and thus more soluble in water. But this may make the blend product 221 more effected by salinity. Thus, the blend product 221 desired may depend on the salinity of the water stream 223 available for the frac operation. In embodiments, the final blend 221 may be suitable for a salinity value of the water stream 223 in the range of about 0 to about 80,000 ppm total dissolved solids.

Composition Example 1

The final blend product of the present disclosure may be in accordance with embodiments herein. Although added at different times during the process/system, the total weight percent of non-polymerized ingredients may be in accordance with the following (in weight percent):

| | |
|---|---|
| Sasol LPA | 19.2% |
| EM-X | 1.72% (a 40/60 to 60/40 (by weight) blend of SMO/ primary surfactant blend) |
| Ice | 12.61% |
| Acrylic Acid | 11.46% |
| 28% Ammonia | 9.21% |
| 25% Versenex 80 | 0.09% |
| 1.25% NaBrO3 | 0.09% |
| Water | 6.92% |
| 53% Acrylamide | 32.43% |
| 0.8% SMBS | 0.096% |
| 2.5% Vazo 52 | 0.33% |
| 32% SMBS | 0.48% |
| Inverter Surfactant | 4.5% |
| TOTAL | 100% |

Composition Example 2

The final blend product of the present disclosure may be in accordance with embodiments herein. Although added at different times during the process/system, the total weight percent of non-polymerized ingredients may be in accordance with the following (in weight percent):

| | |
|---|---|
| Sasol LPA | 21.11% |
| EM-X | 1.91% (a 40/60 to 60/40 (by weight) blend of SMO/ primary surfactant blend) |
| Ice | 6.3% |
| Acrylic Acid | 5.72% |

-continued

| | |
|---|---|
| 28% Ammonia | 4.61% |
| 25% Versenex 80 | 0.10% |
| 1.25% NaBrO3 | 0.10% |
| Water | 16.04% |
| 53% Acrylamide | 37.84% |
| 0.8% SMBS | 0.96% |
| 2.5% Vazo 52 | 0.33% |
| 32% SMBS | 0.48% |
| Inverter Surfactant | 4.5% |
| TOTAL | 100% |

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A system for making a composition of matter, the system comprising;
   a neutralization reactor configured to produce an at least 99% ammonium acrylate neutralization product, wherein the neutralization reactor is operated under pressure, controlled to a neutralization reaction temperature in the range of about 65° F. to about 70° F., and has a bulk reaction residence time of about 0.1 minutes to about 5 minutes;
   an oil phase mixer configured to mix an oil-based material, and a blend of sorbitan monooleate and a nonionic, oil soluble primary surfactant;
   an aqueous phase mixer configured to receive the at least 99% ammonium acrylate neutralization product, and mix with a monomer solution to form an aqueous phase product, wherein the aqueous phase mixer is controlled to produce the aqueous phase product having a pH of about 6.9 to about 7.1;

an emulsifier operated under batch conditions, the emulsifier configured to receive the oil phase product first, and then the aqueous phase product second, and to form a water-in-oil emulsification characterized by having oil as a continuous phase and water as a dispersed phase;

a homogenizer configured to receive the water-in-oil emulsification, and form an emulsification product comprising micelles having a bulk average diameter of about 0.1 microns to about 1 micron;

a polymerization reactor configured to receive the emulsification product and an initiator, and upon reaction to produce a polymerization reaction product, wherein the polymerization reactor is operated at a polymerization reaction temperature in the range of about 175° F. to about 240° F.; and an inversion vessel configured to mix a secondary surfactant with the polymerization reaction product in order to produce the composition of matter, the composition comprising:
15-25% oil phase;
35-50% water;
20-35% polymer;
0-10% surfactant; and
0-3% other trace materials.

2. The system of claim 1, wherein the composition of matter is mixed with a water stream comprising about 0 to about 80,000 ppm total dissolved solids.

3. The system of claim 2, wherein the oil phase is prepared the blend of sorbitan monooleate and primary surfactant having a weight ratio to each other from about 40:60 to about 60:40.

4. The system of claim 3, wherein the weight ratio is about 49:51 to about 51:49.

5. The system of claim 3, wherein the polymer comprises an acrylamide-based copolymer having a molecular weight distribution of about 10 million Daltons to about 30 million Daltons.

6. The system of claim 1, the bulk average diameter of the micelles is about 0.5 microns to about 0.6 microns.

7. The system of claim 1, wherein the secondary surfactant comprises an HLB in a range of about 10 to about 15.

8. The system of claim 1, wherein the polymerization reaction comprises use of an oil-soluble AZO initiator and monomer, and wherein a weight percent ratio of the oil-soluble AZO initiator to monomer is in the range of about (0.01-0.05):1.

9. The system of claim 8, wherein a bulk residence time of the polymerization reaction is in a reaction time range of about 0.01 minutes to about 5 minutes.

10. A system for making a composition of matter, the system comprising;
a neutralization reactor configured to produce a neutralization product, wherein the neutralization reactor is operated under pressure, and controlled to a neutralization reaction temperature in the range of about 65° F. to about 70° F.;
an oil phase mixer configured to mix an oil-based material, and a blend of sorbitan monooleate and a primary surfactant having a weight ratio to each other from about 40:60 to about 60:40;
an aqueous phase mixer configured to receive the neutralization product, and mix with a monomer solution to form an aqueous phase product, wherein the aqueous phase mixer is controlled to produce the aqueous phase product having a pH of about 6.9 to about 7.1
an emulsifier configured to receive and emulsify the oil phase product with the aqueous phase product in order to form a water-in-oil emulsification characterized by having oil as a continuous phase and water as a dispersed phase;
a homogenizer configured to receive the water-in-oil emulsification, and form an emulsification product comprising micelles having a bulk average diameter of about 0.1 microns to about 1 micron;
a polymerization reactor configured to receive the emulsification product and an initiator, and upon reaction to produce a polymerization reaction product, wherein the polymerization reactor is operated at a polymerization reaction temperature in the range of about 175° F. to about 240° F.; and
an inversion vessel configured to mix a secondary surfactant with the polymerization reaction product in order to produce the composition of matter, the composition comprising:
15-25% oil phase;
35-50% water;
20-35% polymer;
0-10% surfactant; and
0-3% other trace materials.

11. The system of claim 10, wherein a weight percent of total constituents used through the system comprises:
19-22% hydrocarbonaceous fluid;
1.5-2.0% blend of 40:60 to 60:40 by weight ratio sorbitan monooleate to primary surfactant;
5-13% ice;
5-12% acrylic acid;
4-10% of 28% ammonia;
0.05-0.15% chelating agent;
0.05-0.15% sodium bromate;
6-17% water;
30-40% of 53% acrylamide;
0.1-0.5% AZO initiator; and
4-5% secondary surfactant.

12. The system of claim 11, wherein the blend weight ratio to each other is about 50:50.

13. The system of claim 10, wherein the polymer comprises an acrylamide-based copolymer having a molecular weight distribution of about 10 million Daltons to about 30 million Daltons, and wherein the bulk average diameter of the micelles is about 0.5 microns to about 0.6 microns.

14. The system of claim 12, wherein the secondary surfactant has an HLB in a range of about 10 to about 15.

15. The system of claim 14, wherein the polymerization reaction comprises use of an AZO initiator and monomer, and wherein a weight percent ratio of the AZO initiator to monomer is in the range of about (0.01-0.05):1.

16. The system of claim 15, wherein the aqueous phase product comprises the neutralization product mixed with water and the monomer solution, wherein the neutralization product comprises at least 99% ammonium acrylate, and wherein the monomer solution comprises acrylamide solution.

17. A system for making a composition of matter, the system comprising;
a neutralization reactor configured to produce a neutralization product, wherein the neutralization reactor is operated under pressure, and controlled to a neutralization reaction temperature in the range of about 65° F. to about 70° F.;
an oil phase mixer configured to mix an oil-based material, and a blend of sorbitan monooleate and a primary surfactant having a weight ratio to each other from about 40:60 to about 60:40;

an aqueous phase mixer configured to receive the neutralization product, and mix with a monomer solution to form an aqueous phase product, wherein the aqueous phase mixer is controlled to produce the aqueous phase product having a pH of about 6.9 to about 7.1 an emulsifier configured to receive and emulsify the oil phase product with the aqueous phase product in order to form a water-in-oil emulsification characterized by having oil as a continuous phase and water as a dispersed phase;

a homogenizer configured to receive the water-in-oil emulsification, and form an emulsification product comprising micelles having a bulk average diameter of about 0.1 microns to about 1 micron;

a polymerization reactor configured to receive the emulsification product and an initiator, and upon reaction to produce a polymerization reaction product, wherein the polymerization reactor is operated at a polymerization reaction temperature in the range of about 175° F. to about 240° F.; and an inversion vessel configured to mix a secondary surfactant with the polymerization reaction product in order to produce the composition of matter, the composition comprising:
15-25% oil phase;
35-50% water;
20-35% polymer;
0-10% surfactant; and
0-3% other trace materials, wherein the polymer comprises an acrylamide-based copolymer having a molecular weight distribution of about 10 million Daltons to about 30 million Daltons, wherein the secondary surfactant has an HLB in a range of about 10 to about 15, and wherein the polymerization reaction comprises use of an AZO initiator and monomer, and wherein a weight percent ratio of the AZO initiator to total monomer is in the range of about (0.01-0.05):1.

* * * * *